Patented Nov. 11, 1947

2,430,586

UNITED STATES PATENT OFFICE 2,430,586

DIHALOPHENYL ALKYL CARBINOL PESTICIDES

Robert F. Ruthruff, Chicago, Ill., Oliver J. Grummitt, Cleveland, Ohio, and Berton C. Dickinson, South Bound Brook, N. J., assignors to The Sherwin-Williams Company, Cleveland, Ohio, a corporation of Ohio No Drawing. Application July 26, 1945, Serial No. 607,260

18 Claims. (Cl. 167—30)

This invention relates to new and improved pest control compositions, more particularly insecticidal and arachnicidal compositions, and especially to compositions which are effective as arachnicides, being excellent exterminators of red spider or red mite.

It is well known that there are several excellent pest control materials available today, including, for example, the material commonly referred to as D. D. T., and which contains as the essential ingredient 1,1-bis(p-chlorophenyl)2,2,2 trichloroethane. While this material is very powerful, it is by no means perfect. Its action is specific and not critical. In other words, it is extremely effective against some pests and has no effect whatsoever on others. Additionally, it kills many beneficial insects such as honey bees as well as insects that are predators against other harmful species. Accordingly, it is obvious that the use of D. D. T. under certain circumstances may do little or no good.

A plant may be infested by two harmful insects, one of which is kept under control by a third predatory insect. On applying D. D. T. in such cases one of the harmful insects and the predatory insect against the other harmful insect may be killed. As a result, the second harmful insect which was previously kept in check by its natural enemy then becomes a serious pest. This may be specifically illustrated in the case of apples. Apple trees are infested by codling moths, aphids and red mites. The last two are more or less controlled by ladybird beetles, other predaceous insects and certain parasitic insects. The D. D. T. destroys the codling moth but at the same time destroys beneficial predators and parasites with the result that the aphid or red mite population may increase to such an extent that these pests may do as much or more harm than was previously caused by the codling moth.

One of the objects of the present invention is to provide a new and improved type of pest control composition which is extremely effective against red mite, also known as red spider.

A further object of the invention is to provide new and improved insecticidal and arachnicidal compositions.

Another object of the invention is to provide new and improved pest control compositions containing compounds which are effective against red mite and compatible with 1,1-bis(p-chlorophenyl)2,2,2 trichloroethane. Other objects will appear hereinafter.

In accordance with the invention, it has been found that di(halophenyl) alkyl carbinols, and especially the compound di(p-chlorophenyl) methyl carbinol, are, in pest control compositions, particularly effective against red mite or red spider, and also can be employed in pest control compositions containing 1,1-bis(p-chlorophenyl)2,2,2 trichloroethane.

The invention will be further illustrated, but is not limited, by the following examples in which the quantities are stated in parts by weight unless otherwise indicated.

Example I

This example illustrates the preparation of the compound di-(p-chlorophenyl) methyl carbinol.

In a 1-liter, three-neck flask fitted with a mercury-seal stirrer, water condenser, and dropping funnel was placed 0.25 mole of methyl-magnesium bromide in 115 ml. of ether solution. To this was added a solution of 63 g. (0.25 mole) of 4,4'-dichlorobenzophenone in 700 ml. of dry benzene at such a rate that the ether refluxed slowly. A transient purple color developed as the ketone was added. After all of the acetone had been added, the reaction mixture was heated with stirring on a steam bath for two hours, during which time a white precipitate appeared in the flask. The mixture was hydrolyzed by pouring onto a mixture of 100 ml. of water, 200 g. of ice and 27 g. of ammonium chloride. After separating the benzene-ether layer and distilling the solvent on a steam bath, 59.3 g. of crude product, M. P. 64–68 degrees were recovered. This crude material was crystallized from 200 ml. of Skelly C to give 41.2 g. of product, M. P. 67–68.5 degrees. Evaporation of the filtrate to 75 ml. yielded 13 g. more of solid; total yield 54.2 g., 0.203 mole, 81.1%. A second preparation gave 53.9 g., melting 68–69.5 degrees, 80.7%.

A melting point determination run on a highly purified sample, using a calibrated thermometer, indicated that the melting point for this compound is 69–69.5 degrees C., uncorrected. Analyses were made which satisfactorily proved the structure of the compound.

Five-tenths of a gram of the carbinol was oxidized in a solution of 2 grams of chromic acid in 20 ml. of glacial acetic acid and 2 drops of concentrated sulphuric acid on refluxing 2 hours. After pouring the mixture onto ice and crystallizing the solid from methanol, 0.3 gram of product melting at 142–144 degrees C. and showing no depression in a mixed melting point with authentic p,p'-dichlorobenzophenone was obtained.

By substituting other alkyl magnesium halides in chemically equivalent proportions for the methyl magnesium bromide, the corresponding di(p-chlorophenyl) alkyl carbinols were produced, including the ethyl, butyl and lauryl derivatives.

Example II

Pest control compositions were prepared by dispersing the compound of Example I in water in varying proportions, and these dispersions were tested by spraying them on a suitable subject infested with greenhouse red spider as the test animal, and observing the results.

In this series of tests a population of all stages of greenhouse red spider was established on the upper surface of the leaves of individually potted Henderson baby lima bean plants, and was limited to this surface by a ring of "tanglefoot."

The test material under constant agitation was applied with a precision spray gun that delivered approximately ⅓ of 1 cc., and application of 8 shots with this precision sprayer represented the maximum application without resulting in subsequent run-off or serious coalescing of droplets. The total amount of liquid delivered was kept constant for all tests; thus, to a 2-shot application of test material was added 6 shots of distilled water.

Since the purpose of this test was primarily to observe the direct contact effect of the materials, mortality records were taken after 48 hours. In general, it may be said that the adults are more difficult to kill than any of the nymphal stages.

The results are illustrated in the following table:

| Concentration in Lbs./100 Gals. of Dispersion | No. of Shots | Total No. of Adults | Total No. of Nymphs | After 48 Hours Per Cent Mortality | | Plant Injury |
|---|---|---|---|---|---|---|
| | | | | Adults | Nymphs | |
| 3 | 2 | 30 | 817 | 100 | 100 | None. |
| 3 | 1 | 39 | 406 | 100 | 100 | Do. |
| 1½ | 8 | 26 | 1,086 | 100 | 100 | Possibly Light. |
| 1½ | 2 | 54 | 70 | 100 | 100 | None. |

To compare the effectiveness of the di(p-chlorophenyl) methyl carbinol with D. D. T. tests were also made with the latter as follows:

| Concentration in Lbs./100 Gals. of Dispersion | No. of Shots | Total No. of Adults | Total No. of Nymphs | After 48 Hours Per Cent Mortality | | Plant Injury |
|---|---|---|---|---|---|---|
| | | | | Adults | Nymphs | |
| 30 | 2 | 22 | 325 | 0 | 37 | None. |
| 30 | 8 | 8 | 206 | 12 | 68 | Do. |

To determine the effectiveness of di(p-chlorophenyl) methyl carbinol as compared with diphenyl methyl carbinol (i. e., unchlorinated), tests were made in a similar manner at 8 shots of 30 pounds to the 100 gallons (200 micrograms per square centimeter), and in these tests the unchlorinated carbinol killed only 35% red spider. At 2 shots of 30 pounds per 100 gallons concentration this same carbinol killed only 10% of the red spider.

By contrast, the p,p'-dichloro derivative killed 100% when applied at these doses, and even at much smaller doses. In fact, a deposit of only 0.5 microgram per square centimeter of di(p-chlorophenyl) methyl carbinol killed about the same as 200 micrograms per square centimeter of the unchlorinated carbinol. Thus, it may be inferred roughly that di(p-chlorophenyl) methyl carbinol is 400 times as toxic to red mite or red spider as the unchlorinated carbinol.

Example III

A series of tests was carried out in a manner similar to that described in Example II, on greenhouse red spider using di-(p-chlorophenyl) methyl carbinol with the following results:

| Concentration in Lbs./100 Gals. of Dispersion | No. of Shots | Total No. of Adults | Total No. of Nymphs | After 48 Hours Per Cent Mortality | | Plant Injury |
|---|---|---|---|---|---|---|
| | | | | Adults | Nymphs | |
| 3 | 1 | 16 | 21 | 100 | 100 | None. |
| 0.3 | 8 | 31 | 237 | 100 | 100 | Do. |
| 0.3 | 4 | 15 | 122 | 100 | 100 | Do. |

Example IV

Tests were conducted with di-(p-chlorophenyl) methyl carbinol against the potato leafhopper. In these tests individual lima bean plants were sprayed on the undersurface of the leaves with a known quantity of insecticide (the potato leafhopper limits its activity to the undersurface of the leaf). Each plant was artificially infested with 10 recently hatched leafhoppers. An examination was made four days later with the following results:

| Concentration Lbs./100 Gals. | No. of Shots | Dead | Living | Unaccounted For | Per cent Mortality |
|---|---|---|---|---|---|
| 3 | 2 | 0 | 9 | 1 | |
| | 2 | 3 | 7 | 0 | |
| Total | | 3 | 16 | 1 | 16 |
| 3 | 8 | 9 | 0 | 1 | |
| | 8 | 9 | 0 | 1 | |
| Total | | 18 | 0 | 2 | 100 |

These tests demonstrated that di(p-chlorophenyl) methyl carbinol had some effect in controlling the potato leafhopper.

Example V

The di(p-chlorophenyl) ethyl carbinol was prepared in the manner described in Example I using chemically equivalent proportions of ethyl magnesium bromide instead of the methyl magnesium bromide.

Tests were conducted with an impure form of this compound to determine its effectiveness in killing greenhouse red spider as described in Example II, with the results given in the following table:

| Concentration in Lbs./100 Gals. of Dispersion | No. of Shots | Total No. of Adults | Total No. of Nymphs | After 48 Hours Per Cent Mortality | | Plant Injury |
|---|---|---|---|---|---|---|
| | | | | Adults | Nymphs | |
| 3 | 8 | 116 | (¹) | 96 | 100 | |

An additional 4% of adults were moribund.

| | | | | | | |
|---|---|---|---|---|---|---|
| 30 | 2 | 84 | (¹) | 100 | 100 | V. L. |
| 30 | 8 | (¹) | (¹) | 100 | 100 | Serious. |
| 3 | 1 | 93 | 112 | 50 | 100 | |

An additional 46% of adults were moribund.

| 3 | 4 | 144 | (¹) | 99 | 100 | |

¹ The remaining adults were moribund.

| 0.3 | 2 | 187 | 50 | 18 | 64 | |

An additional 18% of adults were moribund.

| 0.3 | 4 | 159 | 46 | 32 | 89 | |

An additional 32% of adults were moribund.

| 0.3 | 4 | 64 | 94 | 29 | 89 | None. |

An additional 30% of adults were moribund.

| 3 | 1 | 74 | 148 | 97 | 100 | None. |
| 0.3 | 2 | 121 | 90 | 1 | 25 | Do. |
| 0.3 | 4 | 187 | 194 | 36 | 94 | Do. |

An additional 34% of adults were moribund.

| 0.3 | 8 | 94 | 94 | 46 | 94 | None. |

An additional 43% of adults were moribund.
[1] Not counted.

The impure compound used in the foregoing tests corresponds to the "crude material" obtained in the process of Example I using ethyl magnesium bromide instead of methyl magnesium bromide. A pure form of the compound ethyl di-(p-chlorophenyl) carbinol was also prepared and tested on greenhouse red spider with the following results:

| Concentration in Lbs./100 Gals. of Dispersion | No. of Shots | Total No. of Adults | Total No. of Nymphs | After 48 Hours Per Cent Mortality | | Plant Injury |
|---|---|---|---|---|---|---|
| | | | | Adults | Nymphs | |
| 3 | 1 | 165 | 53 | 18 | 50 | None. |
| 0.3 | 2 | 70 | 484 | 3 | 7 | Do. |
| 0.3 | 4 | 106 | 18 | 0 | 83 | Do. |
| 30 | 2 | ([1]) | ([1]) | 100 | 100 | Possible Light. |
| 30 | 8 | ([1]) | ([1]) | 100 | 100 | Serious. |

| 3 | 8 | 167 | ([1]) | 90 | 100 | None. |

An additional 8% of adults were moribund.

| 3 | 4 | 200 | ([1]) | 75 | 100 | None. |

An additional 20% of adults were moribund.

| 3 | 1 | 127 | 218 | 4 | 67 | None. |
| 3 | 2 | 291 | 292 | 12 | 90 | Do. |

An additional 7% of adults were moribund.

| 0.3 | 4 | 41 | 142 | 4 | 19 | None. |
| 0.3 | 8 | 84 | 45 | 13 | 40 | Do. |

| 3 | 4 | 128 | 188 | 15 | 82 | None. |

An additional 26% of adults were moribund.

| 3 | 8 | 21 | ([1]) | 95 | 100 | None. |

[1] Not counted.

Example VI

The n-butyl di (p-chlorophenyl) carbinol was prepared by the process of Example I except that chemically equivalent proportions of n-butyl magnesium bromide were substituted for the methyl magnesium bromide, and the resultant product was tested on greenhouse red spider with the results given in the following table:

| Concentration in Lbs./100 Gals. of Dispersion | No. of Shots | Total No. of Adults | Total No. of Nymphs | After 48 Hours Per Cent Mortality | | Plant Injury |
|---|---|---|---|---|---|---|
| | | | | Adults | Nymphs | |
| 30 | 2 | ([1]) | ([1]) | 100 | 100 | Light. |
| 30 | 8 | ([1]) | ([1]) | 100 | 100 | Serious. |
| 3 | 1 | 102 | 167 | 83 | 97 | None. |

An additional 11% of adults were moribund.

| 0.3 | 2 | 117 | 41 | 4 | 50 | None. |
| 0.3 | 4 | 105 | 119 | 8 | 79 | Do. |

| 0.3 | 4 | 189 | 368 | 20 | 74 | None. |

An additional 10% of adults were moribund.

| 0.3 | 8 | 97 | ([1]) | 38 | 100 | None. |

An additional 38% of adults were moribund.

| 3 | 1 | 103 | ([1]) | 93 | 100 | None. |

The remaining 7% of adults were moribund.

| 3 | 2 | 143 | ([1]) | 100 | 100 | None. |
| 0.3 | 4 | 121 | 21 | 30 | 90 | Do. |

An additional 25% of adults were moribund.

| 0.3 | 8 | 108 | ([1]) | 53 | 100 | None. |

An additional 42% of adults were moribund.
[1] Not counted.

Example VII

The di(p-chlorophenyl) lauryl carbinol was prepared by the general method given in Example I using lauryl magnesium bromide instead of the methyl magnesium bromide, and the resultant compound was tested on greenhouse red spider. At a dosage of 6.6 micrograms per square centimeter a substantial kill of red spider was obtained although this material was less effective for this purpose than the materials containing lower alkyl groups.

In general, the compounds which are operable for the purpose of this invention have the chemical formula:

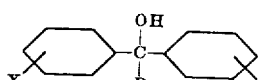

in which X and Y represent hydrogen or halogen (e. g., chlorine, bromine or fluorine), preferably chlorine in the para position of the phenylene nuclei, and R represents alkyl (e. g., methyl, ethyl, propyl, butyl, amyl, hexyl, lauryl and homologous radicals). It will be understood that the halogen may also be present in the ortho or meta positions, and that the invention contemplates compositions containing mixtures of compounds of this type in which the halogen is present in the para, ortho, and/or meta positions. These compounds are herein referred to as the active essential ingredients of the pest control compositions.

In the practice of the invention it is preferable to condition the active essential ingredient by reducing it to a particle size within the range from about 0.5 micron to 10 microns, preferably about 1 to 2 microns.

It is also preferable in accordance with the invention to provide a carrier for the active essential ingredient in order that it may be dispersed properly and to increase the effectiveness. The ingredient di(p-chlorophenyl) methyl carbinol is preferably applied to foliage or other surfaces being treated to the extent of about 1 to about 5 micrograms per square centimeter. In concentrations of 3 pounds per 100 gallons of dispersion, each of the so-called "shots" referred to in the examples corresponds roughly to about 2.5 micrograms per square centimeter. If it is desired to avoid burning the foliage it is preferable to keep the concentration of the active ingredient, as applied, below 20-25 micrograms per square centimeter, although this will vary with the types of foliage.

Various types of carriers may be used, as, for example, magnesium carbonate and magnesium silicate. Unless the pest control composition is to be applied shortly after it is prepared the carrier should be non-acidic because we have found that carbinols of the type employed herein are unstable in the presence of acidic substances. Stability against dehydration of the carbinol is obtained by preparing pest control compositions which are substantially non-acidic. The particle size of the carrier and the active essential ingredient is preferably around 1 to 2 microns. They may be intimately mixed or blended in any suitable manner.

The proportion of the carrier and active essential ingredient may vary rather widely, but for most practical spray purposes equal proportions by weight of carrier and the active essential ingredient have been found to be suitable. In general, the proportions of the active essential ingredient are preferably within the range of 25% to 75% of the total weight of the carrier and said ingredient. In some cases it is desirable to add to the carrier-di(chlorophenyl) alkyl carbinol mixture about 0.5 to about 10% by weight of an anti-bonding agent such as talc.

If the pest control composition is to be applied as a spray, a mixture of a carrier such as magnesium carbonate and the active essential ingredient will give good results. If desired, a wetting agent can be added, for example, lauryl sulfate, although in some instances wetting agents of this type are undesirable because the composition after being applied is more readily dispersed by rainfall. Other types of wetting agents which may be employed are volatile wetting agents such as morpholine.

The compositions of this invention can also be prepared in solvent solutions such as naphtha, or oil solutions, or mixed with water to form emulsions. Another type of composition which can be prepared in accordance with the invention is one in which the active essential ingredient is dispersed in a liquid capable of expanding rapidly to atomize the composition. A composition of this type, for example, may contain up to 5% of the active essential ingredient, up to 10% of acetone or cyclohexanone, which acts as a coupling agent to increase the solubility of the essential ingredient, up to 10% of an oil such as a mineral oil or vegetable oil which serves to regulate the particle size (smaller particles being produced with less oil), and the remainder a solvent capable of expanding rapidly at ordinary temperatures to form a gas as, for instance, difluorodichloro methane or methyl chloride.

The effective concentrations for field use of the active essential ingredient may vary somewhat, but are preferably within the range of 0.25 to 0.5 pound per 100 gallons of dispersion with the preferred amount being about 0.4 pound per 100 gallons.

An important feature of the invention is the provisions of a new and improved pest control composition comprising as one of the active ingredients a bis(chlorophenyl) polychloroethane of the type described in U. S. Patent 2,329,074, more particularly 1,1-bis(p - chlorophenyl) 2,2,2 trichloroethane, and a compound of the type herein described, more particualrly di-p-chlorophenyl) methyl carbinol. While the proportions of these two ingredients may vary, a typical composition provided in accordance with the invention may contain from about ½ pound to 1 pound per 100 gallons of water of 1,1-bis(p-chlorophenyl) 2,2,2, trichloroethane and a ratio of di(p-chlorophenyl) methyl carbinol:1,1-bis(p-chlorophenyl) 2,2,2 trichloroethane within the range from 1:10 to 1:1, calculated in parts by weight.

The pest control compositions provided herein have the advantage that the active essential ingredients are colorless, stable and have a very lasting effect due to their low vapor pressure under the conditions of use. Comparatively few compositions are known today which are effective against red spider or red mite, and some of the combinations which are most widely used have the disadvantage that they stain not only the surface being treated but also the operator.

The present invention also provides a type of pest control composition which kills red spider or red mite as well as certain other types of insects without killing the predatory insects, such as the ladybird beetle. The compositions of the invention which contain chlorinated diphenyl chloroethanes will, of course, also kill the predatory insects, but they have the advantage as compared with the D. D. T. type of composition heretofore in use, that they also kill red mite or red spider. This pest, therefore, does not continue to multiply as has been the case in the previous usage of D. D. T. The compositions of the present invention will not destroy the foliage when employed in the recommended amounts. On the other hand, the D. D. T. type of insecticide alone may have some tendency to produce some marginal or spot burning of the foliage. Continued use of D. D. T. alone, as already explained, brings about a severe mite infestation which in turn causes a severe "bronzing" of foliage. This will vary considerably, depending upon the type of foliage which is being treated.

Having thus described the invention, what we claim as new and desire to secure by Letters Patent of the United States is:

1. A pest control composition comprising essentially a compound having the general formula:

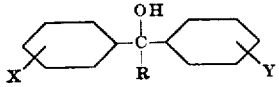

in which X and Y represent halogen, and R is alkyl.

2. A pest control composition comprising essentially a compound having the general formula:

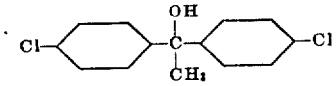

which is a non-staining white solid with a melting point, when pure, of 69-69.5 degrees C., and is further characterized by stability and low vapor pressure under ordinary conditions.

3. A pest control composition comprising essentially a compound having the general formula:

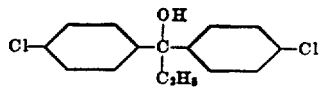

4. A pest control composition comprising essentially a compound having the general formula:

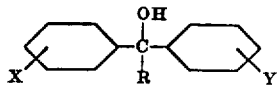

in which X and Y represent halogen, and R is alkyl, conditioned to a particle size within the range from 1 to 10 microns.

5. A pest control composition comprising a compound of the general formula:

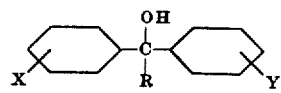

in which X and Y represent hydrogen or halogen and R is alkyl, and a carrier therefor.

6. A pest control composition comprising a compound of the formula:

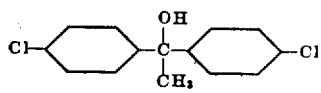

and a carrier therefor.

7. A pest control composition comprising the

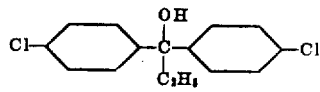

compound and a carrier therefor.

8. A non-acidic composition comprising a compound of the general formula:

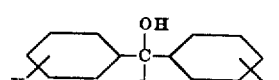

in which X and Y represent hydrogen or halogen and R is alkyl, and a non-acidic carrier therefor.

9. A non-acidic composition comprising a compound of the formula:

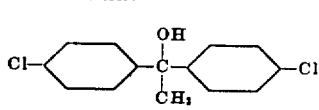

and a non-acidic carrier therefor.

10. A non-acidic composition comprising the compound

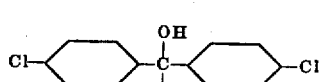

and a non-acidic carrier therefor.

11. An arachnicidal composition comprising as an active essential ingredient the compound

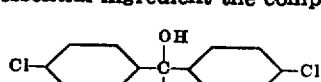

and a non-acidic carrier therefor, the proportion of the active essential ingredient being within the range of about 25% to about 75% of the total weight of said ingredient and said carrier.

12. A dusting composition comprising as an active essential ingredient the compound

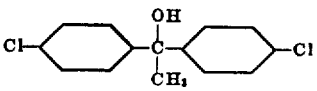

a non-acidic carrier and a substantial quantity of an anti-bonding agent which forms a minor proportion of said composition as compared to said carrier and said active essential ingredient.

13. An arachnicidal composition comprising approximately equal parts by weight of

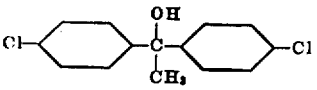

as the active essential ingredient, and a non-acidic carrier therefor, the particle size of said carrier and said active essential ingredient each being within the range of about 0.5 to 10 microns.

14. A pest control composition comprising the compound

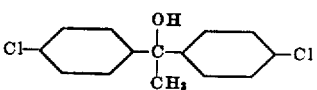

as an active essential ingredient, an approximately equal proportion by weight of magnesium carbonate, and about 0.5 to about 10% by weight of talc, based on the weight of total solids.

15. A method of destroying red mite which comprises applying thereto a compound of the general formula

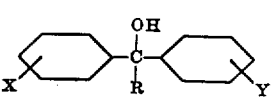

in which X and Y represent hydrogen or halogen, and R is alkyl.

16. A method of destroying red mite which comprises applying to the foliage of vegetation, subject to infestation by red mite, a compound of the formula

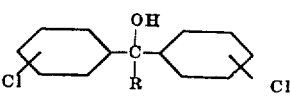

in which R is alkyl.

17. A method of destroying red mite which comprises applying thereto a compound of the formula

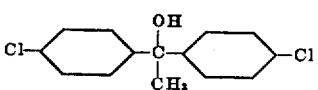

18. A method of destroying pests, including red mite, which comprises applying thereto a composition containing a bis(chlorophenyl) polychloroethane and a compound having the general formula

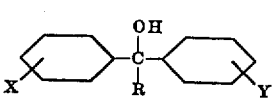

wherein X and Y represent hydrogen or halogen, and R is alkyl.

ROBERT F. RUTHRUFF.
OLIVER J. GRUMMITT.
BERTON C. DICKINSON.

(References on following page)

REFERENCES CITED

The following references are of record in the file of this patent:

UNITED STATES PATENTS

| Number | Name | Date |
|---|---|---|
| 2,005,797 | Moore | June 25, 1935 |
| 2,243,543 | ter Horst | May 27, 1941 |
| 2,329,074 | Muller | Sept. 7, 1943 |
| Re. 22,700 | Muller | Dec. 4, 1945 |
| 1,707,181 | Weiler et al. | Mar. 26, 1929 |

OTHER REFERENCES

Beilstein, Handbuch der Organischen Chemie, 1923 edition, volume 6. Copy in Patent Office Library. P. 685.

Certificate of Correction

Patent No. 2,430,586. November 11, 1947.

ROBERT F. RUTHRUFF ET AL.

It is hereby certified that errors appear in the printed specification of the above numbered patent requiring correction as follows: Column 2, line 23, Example 1, for the word "acetone" read *ketone*; column 8, line 8, for "provisions" read *provision*; line 14, for "particualrly" read *particularly*; column 9, line 39, claim 7, strike out "compound" and insert the same after "comprising the" in line 33, same claim; and that the said Letters Patent should be read with these corrections therein that the same may conform to the record of the case in the Patent Office.

Signed and sealed this 17th day of February, A. D. 1948.

[SEAL]

THOMAS F. MURPHY,
*Assistant Commissioner of Patents.*

REFERENCES CITED

The following references are of record in the file of this patent:

UNITED STATES PATENTS

| Number | Name | Date |
|---|---|---|
| 2,005,797 | Moore | June 25, 1935 |
| 2,243,543 | ter Horst | May 27, 1941 |
| 2,329,074 | Muller | Sept. 7, 1943 |
| Re. 22,700 | Muller | Dec. 4, 1945 |
| 1,707,181 | Weiler et al. | Mar. 26, 1929 |

OTHER REFERENCES

Beilstein, Handbuch der Organischen Chemie, 1923 edition, volume 6. Copy in Patent Office Library. P. 685.

Certificate of Correction

Patent No. 2,430,586.

November 11, 1947.

ROBERT F. RUTHRUFF ET AL.

It is hereby certified that errors appear in the printed specification of the above numbered patent requiring correction as follows: Column 2, line 23, Example 1, for the word "acetone" read *ketone*; column 8, line 8, for "provisions" read *provision*; line 14, for "particualrly" read *particularly*; column 9, line 39, claim 7, strike out "compound" and insert the same after "comprising the" in line 33, same claim; and that the said Letters Patent should be read with these corrections therein that the same may conform to the record of the case in the Patent Office.

Signed and sealed this 17th day of February, A. D. 1948.

[SEAL]

THOMAS F. MURPHY,
*Assistant Commissioner of Patents.*